US012383991B2

(12) United States Patent
Stern

(10) Patent No.: US 12,383,991 B2
(45) Date of Patent: Aug. 12, 2025

(54) ULTRASONIC WELDING SYSTEM

(71) Applicant: Stern Brands, Inc., Melbourne, FL (US)

(72) Inventor: James Stern, Melbourne, FL (US)

(73) Assignee: Stern Brands, Inc., Melbourne, FL (US)

( * ) Notice: Subject to any disclaimer, the term of this patent is extended or adjusted under 35 U.S.C. 154(b) by 0 days.

(21) Appl. No.: 18/442,917

(22) Filed: Feb. 15, 2024

(65) Prior Publication Data

US 2024/0269782 A1   Aug. 15, 2024

Related U.S. Application Data

(60) Provisional application No. 63/445,905, filed on Feb. 15, 2023.

(51) Int. Cl.
| | |
|---|---|
| *B23K 20/10* | (2006.01) |
| *B23K 26/382* | (2014.01) |
| *B23K 37/04* | (2006.01) |
| *B23K 37/047* | (2006.01) |

(52) U.S. Cl.
CPC ........ *B23K 37/0408* (2013.01); *B23K 20/103* (2013.01); *B23K 26/382* (2015.10); *B23K 37/047* (2013.01)

(58) Field of Classification Search
CPC .............. B23K 37/0408; B23K 26/382; B23K 37/047; B23K 20/10–106; B29C 65/08
USPC ...................... 228/110.1, 1.1, 160, 49.1, 49.4
See application file for complete search history.

(56) References Cited

U.S. PATENT DOCUMENTS

2020/0324362 A1* 10/2020 Vogli ...................... B32B 15/20
2024/0269782 A1*  8/2024 Stern .................. B23K 37/0408

FOREIGN PATENT DOCUMENTS

| CN | 113500785 A | * | 10/2021 | |
|---|---|---|---|---|
| CN | 114179385 A | * | 3/2022 | |
| CN | 114700604 A | * | 7/2022 | |
| CN | 115139537 A | * | 10/2022 | |
| EP | 2862696 A1 | * | 4/2015 | .......... A01G 25/026 |
| EP | 3517278 A1 | * | 7/2019 | ....... A61F 13/15699 |
| JP | 10278470 A | * | 10/1998 | ............ B29C 65/08 |

(Continued)

*Primary Examiner* — Kiley S Stoner
(74) *Attorney, Agent, or Firm* — Widerman Malek, PL; Mark Malek; Jonathan Staudt

(57) ABSTRACT

An ultrasonic welding system for assembling materials is provided. The system may comprise a feeding device, a fabrication system, a product uniformer, and a finalization system. The feeding device may include pace feeders, position feeders, and one or more of a retention member. The pace feeders may carry and supply product materials to be distributed by the position feeders and layered by the retention member. The fabrication system may include a main retention member, attachment apparatuses, anvils, and an aperture generator. The attachment apparatuses and anvils may be utilized to crate one or more of an attachment point on the layered product materials, and the aperture generator may be utilized to create at least one through-hole ending through at least a portion of the layered product materials. The finalization system may comprise a product separator and a motion inducer. The product separator may separate the layered product materials.

20 Claims, 14 Drawing Sheets

(56) References Cited

FOREIGN PATENT DOCUMENTS

KR           102276947 B1 *   7/2021
WO     WO-02093524 A1 *  11/2002   ........... G06K 19/027

* cited by examiner

FIG. 10

ULTRASONIC WELDING SYSTEM

RELATED APPLICATIONS

This application claims priority under 35 U.S.C. § 119(e) of U.S. Provisional Patent Application Ser. No. 63/445,905, and titled ULTRASONIC WELDING SYSTEM AND ASSOCIATED METHODS, the entire contents of which is incorporated herein except to the extent where the contents therein conflicts with the contents herein.

FIELD OF THE INVENTION

The present invention relates to systems and methods for assembling materials by ultrasonic stitching into a finished product.

BACKGROUND OF THE INVENTION

Systems utilized to manufacture goods are well known in the art. Traditional manufacturing system may allow for productive and precise assembling of a variety of goods. However, no known system allows for finished products to be continuously made by layering the materials, attaching one or more layers together, creating an aperture in one or more of the layers, and separating portions of the layered materials to create the finished product and with little to no manual action needed throughout the operation of the system from start to finish of the product's assembly. Therefore, there exists a need for an effective system to advantageously create finished products with little to no manual action required for finished products requiring layering, attachment, through-holes, and separation of product materials during its assembly.

This background information is provided to reveal information believed by the applicant to be of possible relevance to the present invention. No admission is necessarily intended, nor should be construed, that any of the preceding information constitutes prior art against the present invention.

SUMMARY OF THE INVENTION

With the above in mind, the present invention is directed to an ultrasonic welding system for assembling materials. The system may include a feeding device comprising. The feeding device may comprise a plurality of pace feeders. Each of the plurality of pace feeders may be configured to carry and supply product material. The feeding device may also comprise a plurality of position feeders. Each of the position feeders may be configured to receive and distribute the product material from the pace feeders. The feeding device may also include retention members to receive, distribute, and layer the product material from the position feeders to form a layering of product materials.

The system may also include a fabrication system. The fabrication system may include a main retention member to receive and distribute the layering of product materials along a path of travel. The fabrication system may also include attachment apparatuses positioned on a first side of the path of travel. The fabrication system may further include anvils positioned on a second side of the path of travel opposite the first side. Each of the anvils are positioned adjacent to one of the attachment apparatuses to define a contact point between the anvils and the attachment apparatuses. The fabrication system may still further include an aperture generator to create a through-hole that extends through at least a portion of at least one layer of the layering of product materials. At least one portion of the layering of product materials is pressed to create an attachment point at the contact point to attach layers of the layering of product materials.

The system may also include a product uniformer to receive and distribute the layering of product materials. The product uniformer may also grip and move the layering of product materials along the path of travel. The system further includes a finalization system. The finalization system includes a product separator to cut the layering of product materials into a plurality of finished products. The finalization system further includes a motion inducer to eject each of the finished products from the product separator.

The system may also include pace resisters that are each attached to the pace feeders. The product materials may be provided as a roll of product materials. Each of the pace feeders may rotatably move about an axis to supply the roll of product materials. The pace resistors may selectively apply a resistance force that opposes the rotational movement of the pace feeders to apply a tension force to the product materials when moved by the product uniformer. The position feeders may selectively actuate along a longitudinal axis to receive and dispense the product materials at a predetermined position relative to the retention member.

The system may further include position sensors that are positioned adjacent to the position feeders. Each of the position sensors may detect the position of the product materials. Further, each of the position sensors may emit a product position signal related to the position of the product material along the position feeder. The product position signal is received by a feeding device controller, and the feeding device controller is configured to control the actuation of the position feeders based on the product position signal. The feeding device may be positioned to be separate and spaced apart from the fabrication system. Each of the product materials that are to be used in connection with the system may have a different size and shape.

The aperture generator may create a plurality of through-holes that may be arranged in a predetermined pattern. The system may also be configured to create a plurality of attachment points that are formed in a predetermined pattern. The attachment apparatuses may include an attachment generator to generate an ultrasonic frequency to generate heat at the contact point to create the attachment points. The attachment apparatuses may also include a horn attached to the attachment generator to transfer the ultrasonic frequency to the contact point. The heat generated at the contact point by the ultrasonic frequency causes the layering of product materials to melt locally at the contact point to create the attachment point.

The attachment apparatuses may actuate relative to the anvils to press the portion of the layering of product materials against the anvils. Each of the anvils may include a plurality of anvil teeth positioned along a curved surface of the anvil. The anvils can be rotatably moved to position the plurality of anvil teeth at the contact point to press the portion of the layering of product materials against the attachment apparatuses.

The aperture generator may be provided by a laser, a puncher, or a cutting instrument. The product materials may be provided by a material that can be melted when exposed to ultrasonic frequencies having an amplitude range of about 30 to 125 microns.

The product separator may include a separation platform and a cutting implement. The cutting implement may actuate relative to the separation platform to cut the layering of product materials into one of the finished products. The separation platform may include a division area that travels through a length of a surface of the separation platform to actuate the cutting implement to cut the layering of product materials without coming into contact with the separation platform.

The system may further include a main system controller to control the feeding device, the fabrication system, the product uniformer, and the finalization system. The system may still further include a product reporter in communication with a reporter sensor. The reporter sensor may detect when each of the finished products are ejected and emits a product count signal. The product reporter may also display a product count based on the product count signal. The system may also include shielding positioned to enclose a portion or all of the fabrication system. The shielding may include a laser light filtering window.

BRIEF DESCRIPTION OF THE DRAWINGS

Some embodiments of the present invention are illustrated as an example and are not limited by the figures of the accompanying drawings, in which like references may indicate similar elements.

FIG. 10 is a graphical user interface product reporter of the ultrasonic welding system illustrated in FIG. 1.

DETAILED DESCRIPTION OF THE INVENTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Those of ordinary skill in the art realize that the following descriptions of the embodiments of the present invention are illustrative and are not intended to be limiting in any way. Other embodiments of the present invention will readily suggest themselves to such skilled persons having the benefit of this disclosure. Like numbers refer to like elements throughout.

Although the following detailed description contains many specifics for the purposes of illustration, anyone of ordinary skill in the art will appreciate that many variations and alterations to the following details are within the scope of the invention. Accordingly, the following embodiments of the invention are set forth without any loss of generality to, and without imposing limitations upon, the invention.

In this detailed description of the present invention, a person skilled in the art should note that directional terms, such as "above," "below," "upper," "lower," and other like terms are used for the convenience of the reader in reference to the drawings. Also, a person skilled in the art should notice this description may contain other terminology to convey position, orientation, and direction without departing from the principles of the present invention.

Furthermore, in this detailed description, a person skilled in the art should note that quantitative qualifying terms such as "generally," "substantially," "mostly," and other terms are used, in general, to mean that the referred to object, characteristic, or quality constitutes a majority of the subject of the reference. The meaning of any of these terms is dependent upon the context within which it is used, and the meaning may be expressly modified.

An embodiment of the invention, as shown and described by the various figures and accompanying text, provides an ultrasonic welding system 100 that may be used to assemble, create, and/or fabricate various products from one or more product materials 200. As described above and throughout below, the ultrasonic welding system 100 may have a plurality of configurations and a plurality of embodiments that may be implemented to assemble and/or crate a respective variety of products.

Figure 1:
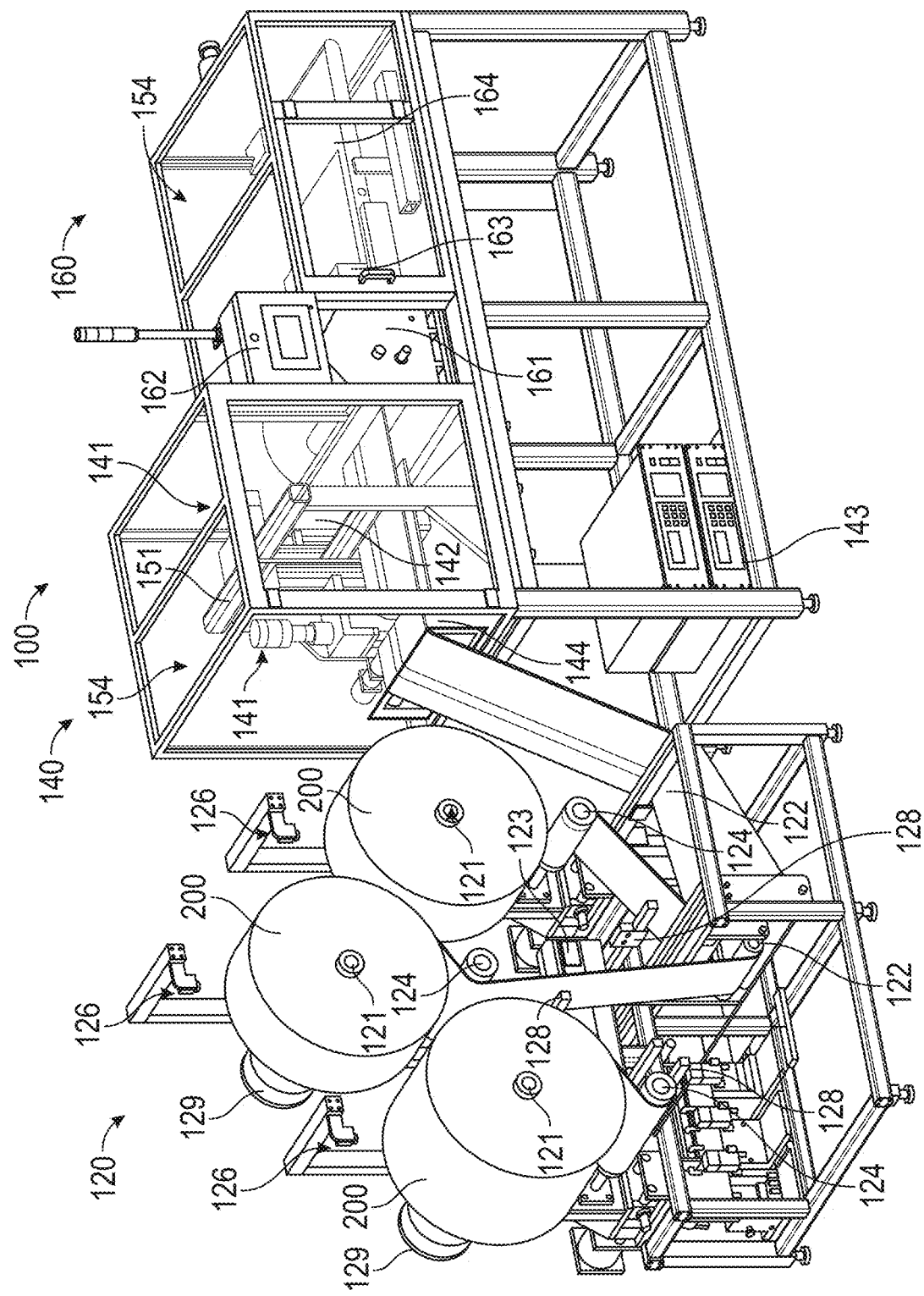
FIG. 1 is a perspective view of an ultrasonic welding system according to an embodiment of the present invention with a feeding device, a fabrication system, and a finalization system.
Figure 11:
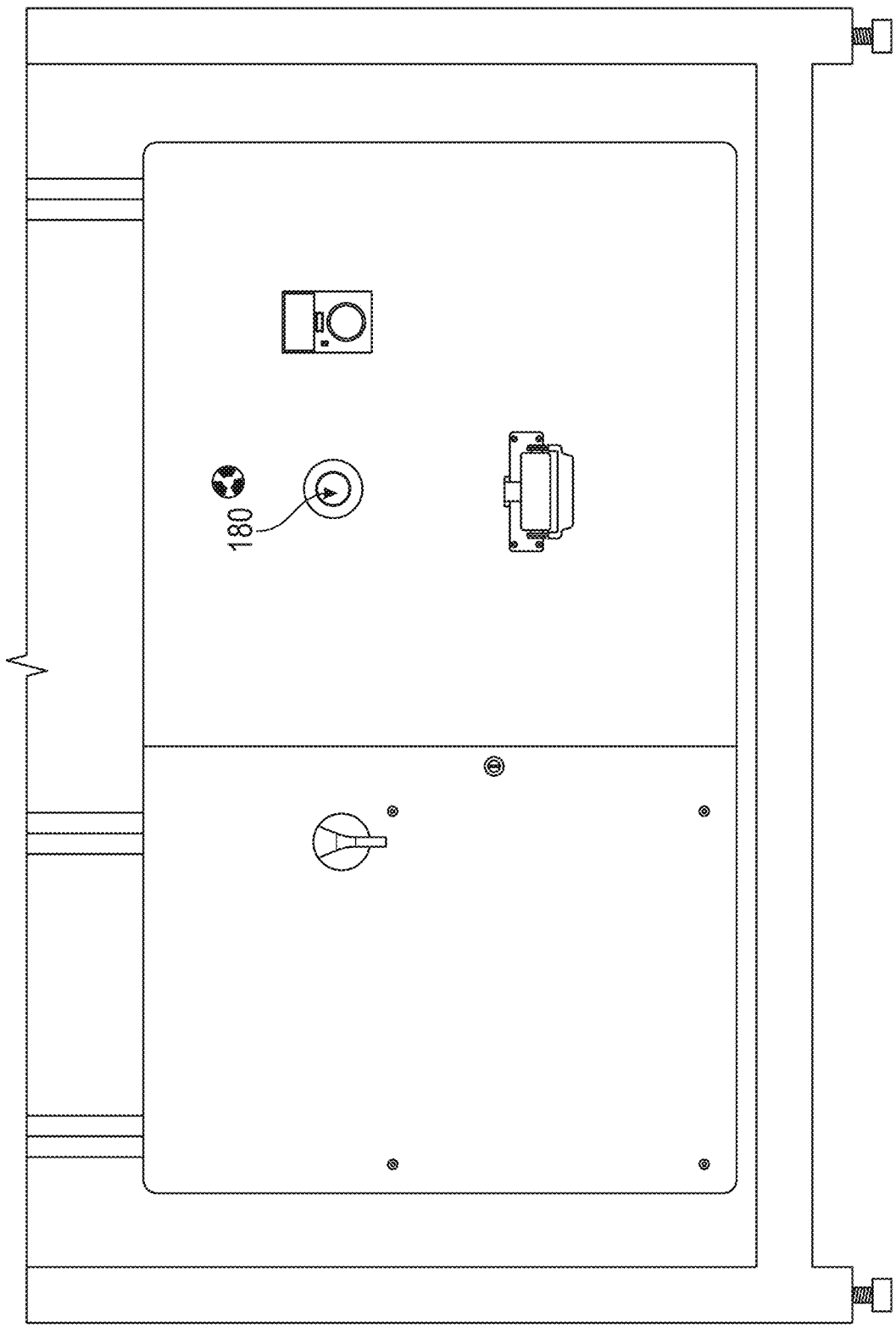
FIG. 11 is a perspective view of a control unit that may be used in connection with the ultrasonic welding system illustrated in FIG. 1.
Figure 12:
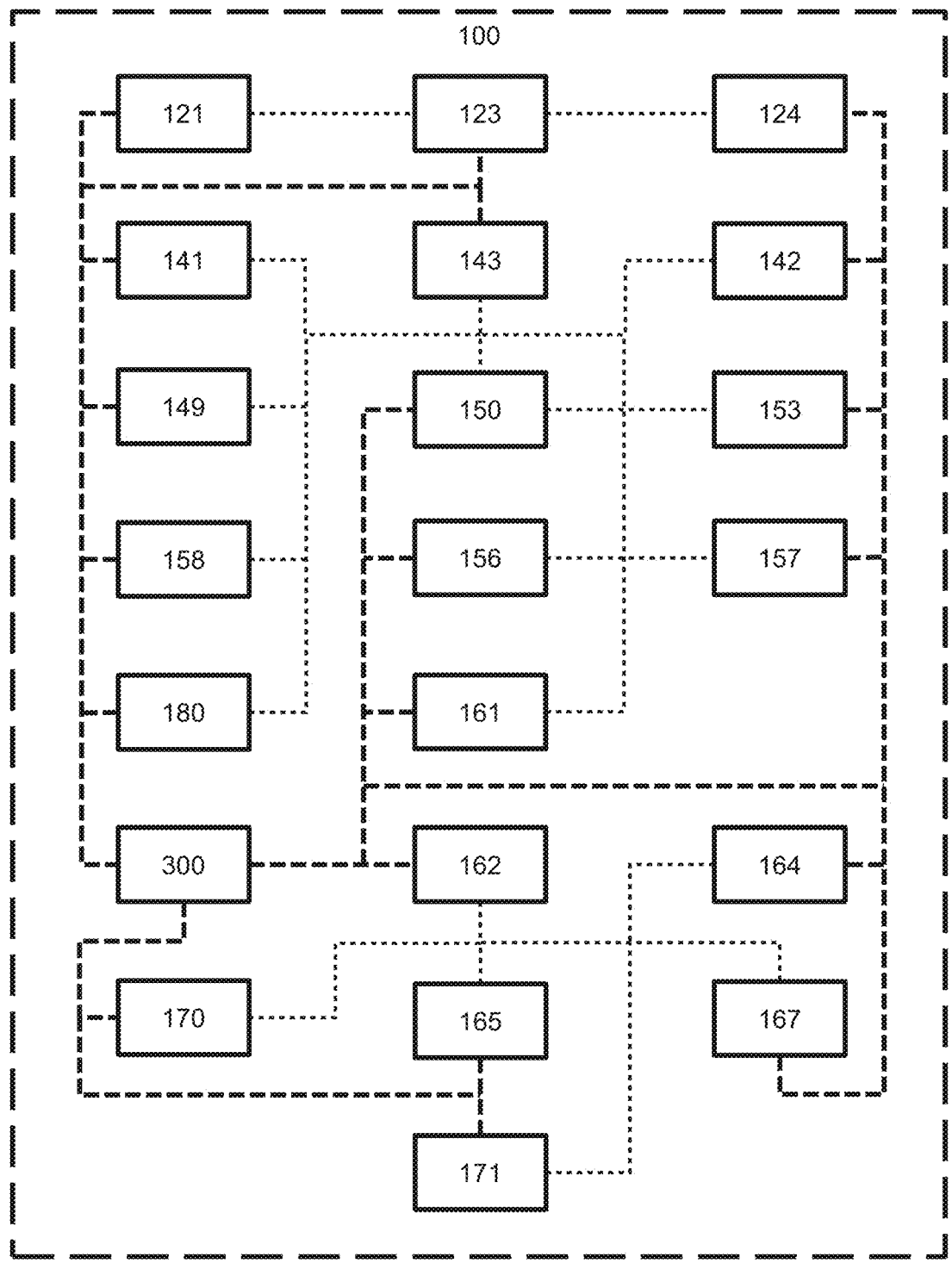
FIG. 12 is a schematic diagram of components of an ultrasonic welding system according to an embodiment of the present invention.

Initially referring to FIGS. 1 and 11-12, the system 100 may include a feeding device 120, a fabrication system 140, and a finalization system 160. The feeding device 120 may carry one or more product materials 200. The feeding device 120 may feed the product materials 200 towards and into the fabrication system 140 at which the product materials 200 may be fed/pulled at a predetermined and/or controlled rate of speed, and/or at a speed that may be computationally determined and maintained by the feeding device 120, a feeding device controller 123, a product uniformer 161, a main system controller 162, a control unit 180. In some embodiments of the present invention the product uniformer 161 may be the main component that pulls and pushes the product materials 200 through and out of the system 100. The feeding device 120 may also organize and/or assemble the product materials 200 before and/or during feeding the product materials 200 to the fabrication system 140. Further detail on the product uniformer 161 follows further below.

Figure 4:
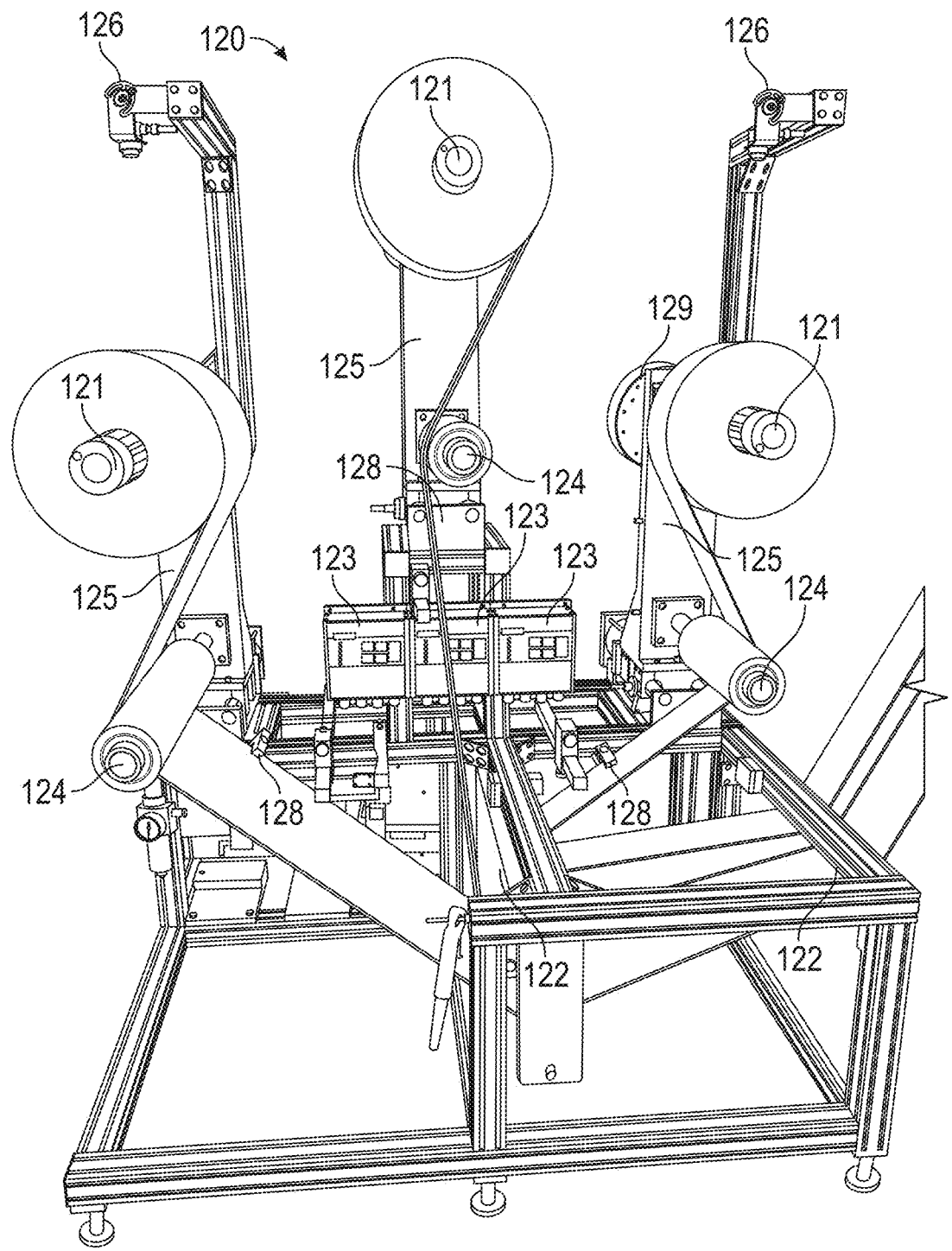
FIG. 4 is a perspective view (photograph) of the feeding device shown in FIG. 1.

Now additionally referring to FIG. 4, the feeding device 120 may include a feeder frame structure 125 and pace feeders 121, retention members 122, position feeders 124, and/or feeding device controllers 123. The pace feeders 121 may be connected to and/or carried by the feeder frame structure 125. More specifically, the pace feeders 121 may be connected to and/or carried by an upper portion of the feeder frame structure 125. The pace feeders 121 may be adapted to carry product materials 200 that may comprise rolls of material. The pace feeders 121 may be configured to release, distribute, and/or extrude the product materials 200 at a predetermined rate, or at a computationally determined rate. The pace feeders 121 may comprise of elongated members that rotate and are configured to engage a roll of product materials 200. The pace feeders 121 may be adapted to automatically adjust and maintain the rate at which the product materials 200 are fed/pulled into the fabrication system 140 with the assistance of respective pace resistor 129 based on detected events and/or by manually made inputs into the feeding device controllers 123 and the main system controller 162. The pace resistors 129 may be in connected to a respective pace feeder 121 and configured to apply a resistance force opposing the rotational force applied to the pace feeders 121 by the product materials 200 being pulled from the pace feeder 121. Further details on the feeding device controllers 123, and the main system controller 162 follows further below.

For example, and without limitation, the pace feeders 121 may be configured to detect when product materials 200 are being released too fast and/or being released too slow based on a tension force applied to the pace feeders 121 by the product materials 200 that are released from the pace feeders 121, which may be defined as a tension value. Also, those skilled in the art will appreciate that the product material being released too fast or too slow may be caused by any number of factors. More specifically, the pace feeders 121 may detect when the product materials 200 being released are applying a tension force to the pace feeders 121 that is greater than a predetermined tension value and may cause a predetermined action to take place. For example, if the product materials 200 are applying a rotational force to the pace feeders 121 greater than the predetermined tension value, then the pace feeders 121 may increase the rate at which the product materials 200 are released by reducing the amount of resistance force applied to the pace feeders 121 by the pace resistors 129. Additionally, the pace feeders 121 may detect when the product materials 200 being released are applying a force to the pace feeders 121 that is less than a predetermined tension value and may decrease the rate at which the product materials 200 are released by increasing the resistance force applied to the pace feeders 121 by the respective pace resistor 129. Further details on the predetermined tension value follows further below.

The position feeders 124 may be carried by the feeder frame structure 125 and may be positioned in proximity to the pace feeders 121. Preferably, the position feeders 124 are positioned on a lower portion of the feeder frame structure 125 relative to the to the position of the pace feeders 121. Those skilled in the art, however, will appreciate that the position feeders 124 may be positioned in another location relative to the pace feeders 121. Further, those skilled in the art will appreciate that the number of position feeders 121 equal the number of pace feeders 124. In other words, for every pace feeder 121, there is a respective position feeder 124. The position feeders 124 may comprise elongated rollers that may be configured to actuate relative to the feeder frame structure 125. The position feeders 124 may be configured to rotate about an axis that extends longitudinally through a center of the position feeder 124.

The position feeders 124 may also be configured to assist the pace feeders 121 in releasing the product materials 200, and the position feeders 124 may be configured to ensure that the product materials 200 do not become positioned and/or oriented in an undesirable way. For example, and without limitation, when the product materials 200 are a flat paper-sized-like material, it may be desirable to retain the released product materials 200 in a uniform flat-like state such that the product materials 200 do not fold as it is being released and maintains a desired layout. It is also important to ensure that the product material 200 remains taut while being fed/pulled through the feeding device 120. The position feeders 124 are positioned to ensure that the product material 200 remains taut as it is being fed/pulled through the feeding device to advantageously prevent any folds in the material as it is being fed/pulled. The maintenance of the desired layout may also be assisted by one or more retention members 122 positioned along the route that the product materials 200 are released by the pace feeders 121 and pulled/pushed by the product uniformer 161 through the fabrication system 140 and through the finalization system 160.

As mentioned above, the position feeders 124 may be configured to move and/or actuate relative to the feeder frame structure 125 to move and/or maintain the released product materials 200 at a predetermined position relative to the fabrication system 140 (illustrated in FIGS. 5 and 6 and described in greater detail below). For example, and without limitation, the position feeders 124 may be configured to determine the position of the product material 200 that is adjacent to the respective position feeder 124 relative to the fabrication system 140 and/or a retention member 122 or the main retention member 144 to which the product materials 200 are being released towards. Based on the position of the product materials 200 detected by the position feeders 124, the position feeder 124 may actuate to maintain the releasing the product material 200 at and/or towards the predetermined positioning of the product material 200 relative to the fabrication system 140 and/or the retention member 122 or main retention member 144 that the product materials 200 are being released towards.

Continuing to refer to FIG. 4 and referring additionally to FIG. 12, a feeding device controller 123 may be carried by the feeder frame structure 125. The feeding device controllers 123 may be in communication with the pace feeders 121 and in communication with the position feeders 124. In some embodiments where more than one feeding device controller 123 is used, the feeding device controllers 123 may be in communication with one another. The feeding device controllers 123 may manage, control, and monitor the operation and status of the pace feeders 121 and the position feeders 124. The feeding device controllers 123 may include a feeder user interface that allows a user to control the pace feeders 121 and the position feeders 124 based on inputs made by the users. For example, the feeder user interface of the feeding device controllers 123 may allow inputs for a user to control the output/feed speed and tension values of the product material 200 by the feeding device 120 such that a predetermined speed and a predetermined tension value may be selected by a user via one or more of the feeding device controllers 123.

The user interface of the feeding device controllers 123 may also allow a user to input parameters of the product materials 200 by the feeding device 120. For example, without limitation, the user interface of the feeding device controllers 123 may include controls to allow a user to input the trim, diameter, taper, and/or taper percent of the product material 200 that is carried by and/or released by the feeding device 120.

Some embodiments of the present invention may include position sensors 128. The position sensors 128 may be positioned adjacent to the product materials 200 following a respective position feeder 124 relative to the path of travel of the product materials 200 through and/or in the feeding device 120. The position sensors 128 may be in communication with a respective feeding device controller 123. The position sensors 128 may sense and/or detect the position of the product materials 200 following the position feeders 124 relative to the position sensor 128. The position sensors 128 may comprise a camera, trip laser, and/or an air break.

The position sensors 128 may emit a product position signal relating to the position of the product materials 200 relative to the position of the position sensor 128. The feeding device controllers 123 may receive the product position signal and cause the position feeders 121 to actuate to adjust the position of the product materials 200 that are in contact with the relevant position feeder 121. For example, and without limitation, feeding device controller 123 receiving a product position signal that the product materials 200 are positioned too far off in a direction from a predetermined position sensor 128 position, the feeding device controller 123 may cause the respective positioned feeder 121 to actuate in that direction in order to correct the product materials 200 to move the product materials 200 back towards the predetermined position sensor 128 position.

In some embodiments of the present invention, the feeding device 120 may comprise one or more pace feeders 121 and a respective number of position feeders 124. For example, without limitation, three pace feeders 121 and three position feeders 124 as illustratively shown in FIGS. 1 and 4. The pace feeders 121 and the position feeders 124 may work in conjunction to feed each pace feeder's 121 respective supply of product material 200 to a predetermined point, such as, towards a retention member 122. In some embodiments of the present invention, the pace feeders 121 may carry and/or feed product materials 200 that are different materials and/or sizes and work in conjunction with the respective position feeders 124 to layer the product materials 200 to be overlaying one another. For example, as illustratively shown in FIGS. 4 and 14, each of the three pace feeders 121 may carry and release product material 200 that is at a different size/width from the other pace feeders 121 with the different product materials 200 being laying with each other to make a three-layered sheet of product materials 200.

Figure 14:
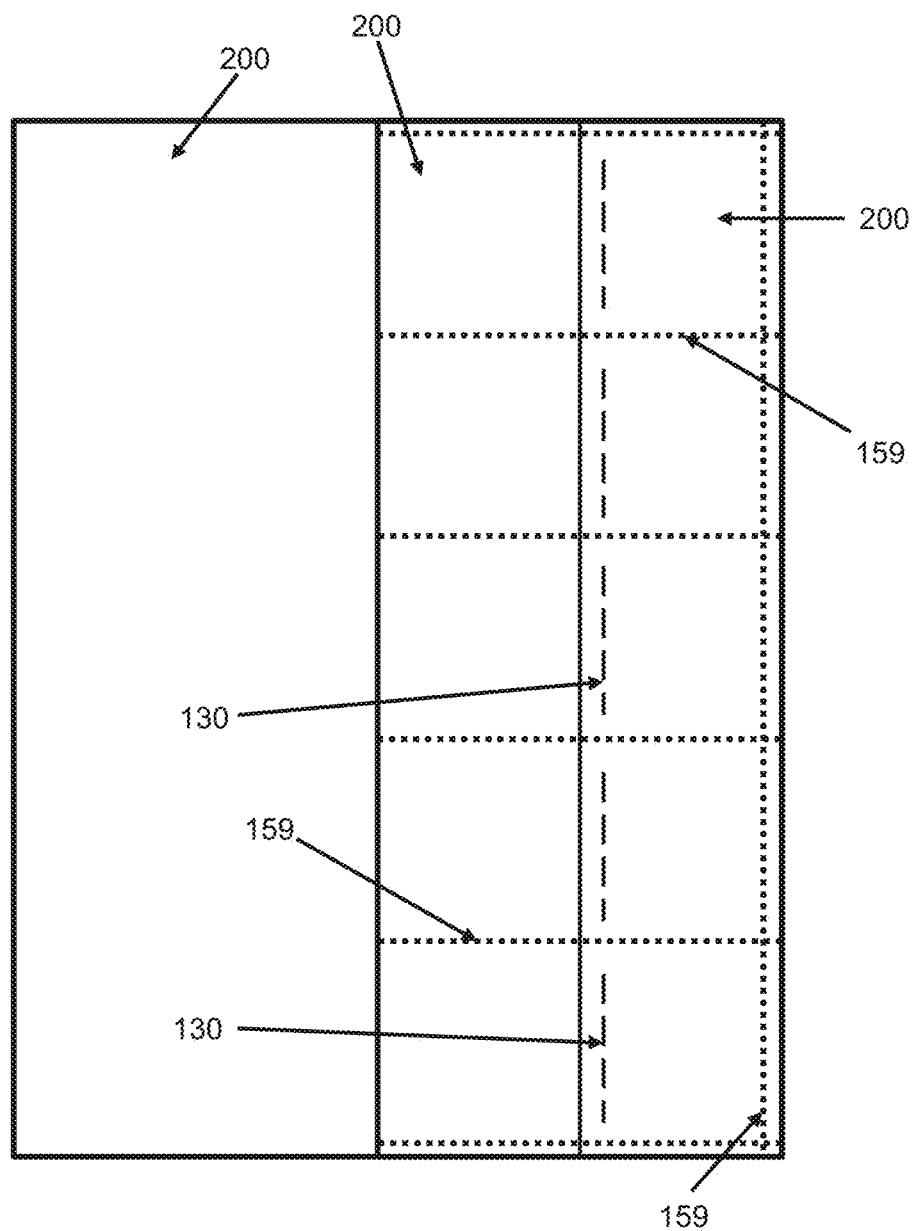
FIG. 14 is a top plan view of an exemplary product that may be assembled using an embodiment of the present invention.

It is contemplated and well understood that the number of pace feeders 121 and the number of position feeders 124 is dependent upon the number of product materials 200 that are required to create a selected final product, such as, the final product illustratively shown in FIG. 14 that requires three layers of product materials 200 to create. Thus, it is contemplated and well understood that embodiments of the present invention may comprise different numbers of pace feeders 121 and their respective position feeders 124 based upon the number of product material 200 layers that are needed to create the selected final product. Some embodiments of the present invention may be configured to allow a user to install and to uninstall pace feeders 121 and position feeders 124 so that the desired number of product material 200 layers can be made to create a selected final product.

Now referring to FIGS. 1, 5-6, and 12-14, the fabrication system 140 may include a support structure 151, one or more retention members 122, a main retention member 144, attachment apparatuses 141, aperture generators 142, actuators 150, and anvils 145. The main retention member 144 may be positioned apart from, but adjacent to, the feeding device 120. The main retention member 144 may be positioned above the last retention member 122 of the feeding device 120 that the product materials 200 come in contact with as the product materials 200 travel through the feeding device 120.

The product materials 200 may be led into the fabrication system 140 from the feeding device 120 by the main retention member 144. In some embodiments of the present invention the main retention member 144 may alternatively comprise a retention member 122. The product materials 200 may comprise a layering of multiple product materials 200. The main retention member 144 may receive product materials 200 from the feeding device 120 as layered product materials 200 that may comprise of product materials 200 that vary in size and shape from one another. For example, and without limitation, the product materials 200 may have widths that are different from one another. The product materials 200 may move in a path of travel through the system 100 and the fabrication system 140 designated by the arrow located shown within the product materials 200 illustratively shown in FIG. 13.

Figure 13:
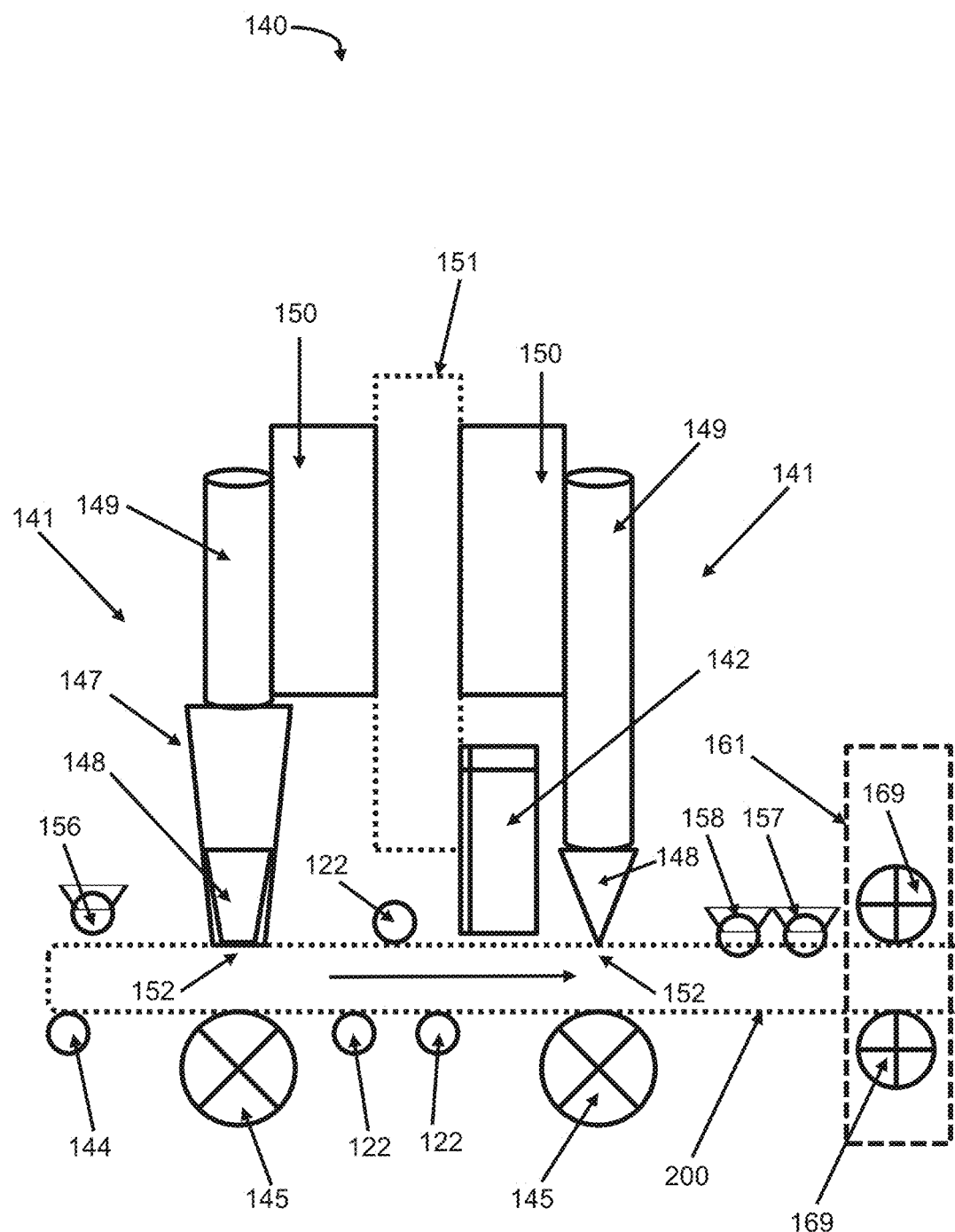
FIG. 13 is a schematic diagram of the fabrication system according to FIG. 1, showing a product uniformer.

Some embodiments of the present invention may include a feed sensor 156 (see FIGS. 12 and 13). The feed sensor 156 may be configured to sense and detect when product materials 200 are being fed into the fabrication system 140. The feed sensor 156 sensor may be in communication with the main system controller 162. The feed sensor 156 may emit a product detection signal relating to the presence of product material 200, and the product detection signal may be receivable by the main system controller 162. Upon the main system controller 162 receiving the product detection signal, the main system controller 162 may cause a predetermined action to take place. For example, without limitation, upon the main system controller 162 receiving a product detection signal informing that there is no product material 200 detected by the feed sensor 156, the main system controller 162 may cause the attachment system 141 and/or the aperture generator 142 to stop and/or stand by. In some embodiments of the present invention, the feed sensor 156 may include an alarm that may sound when the feed sensor 156 detects that no product material 200 is present.

Figure 2:
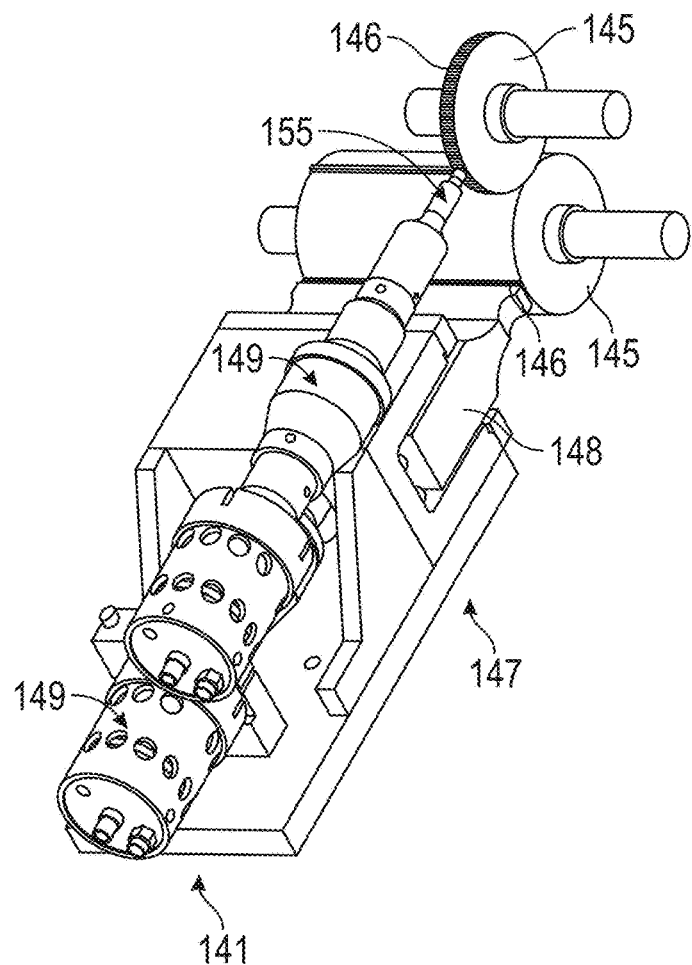
FIG. 2 is a perspective view of two attachment apparatuses and a respective number of attachment rollers according to an embodiment of the present invention.
Figure 3:
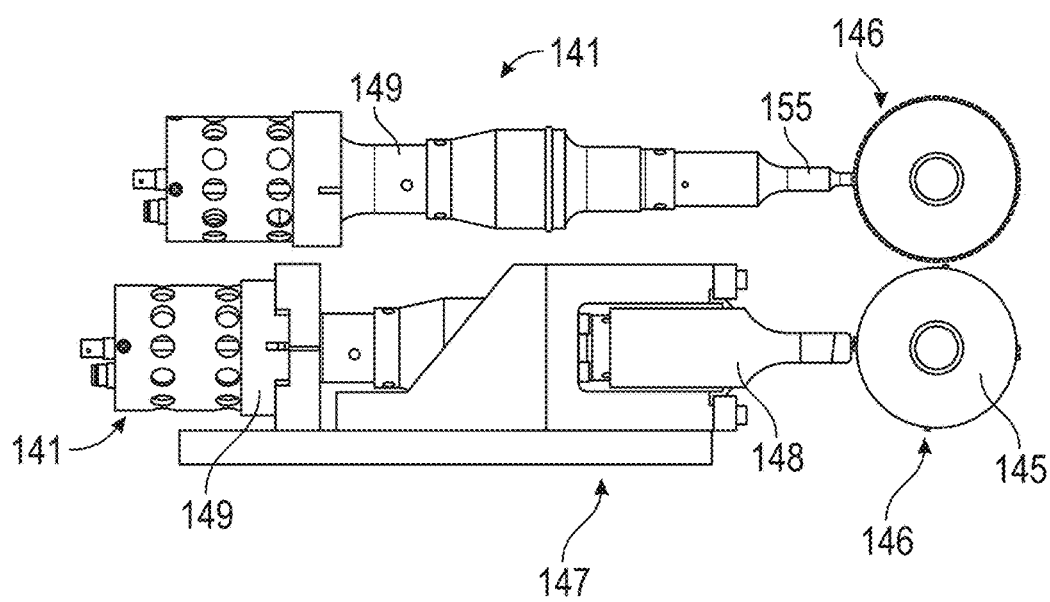
FIG. 3 is a side elevation view of the two attachment apparatuses and respective number of attachment rollers according to FIG. 2.

Referring now back to FIGS. 2-3, the attachment apparatuses 141 may be attached to the support structure 151. The attachment between the attachment apparatuses 141 may be via an actuator 150, such that actuation movements of the actuator 150 may actuate the respective attachment apparatus 141 that is connected to the actuator 150 and actuate the attachment apparatus 141 relative to the support structure 151. The attachment apparatuses 141 may be configured to attach, sew, weld, and/or connect product materials 200 together. Preferably, the attachment apparatuses 141 attach, sew, weld, and/or connect product materials 200 together via ultrasonic vibrations/frequencies that cause a generation of heat in product materials 200 which come in contact with the attachment apparatus 141 at a contact point 152.

The contact point 152 may be defined as when and where the product materials 200 are pressed between the attachment apparatus 141 and an anvil 145 and/or one or more anvil teeth 146 positioned on the anvil 145. The heat generated in the product materials 200 at the contact point 152 may cause the product material 200 to melt locally at that contact point 152, and once the melted portions of the product materials 200 cool, the product material 200 may have had an attachment formed (attachment point 159) at the cooled portions which may attach the product material 200 to itself and/or to other product materials 200 as illustratively shown in FIG. 14. More details on the anvil 145 and the anvil teeth 146 follows further below.

Figure 5:
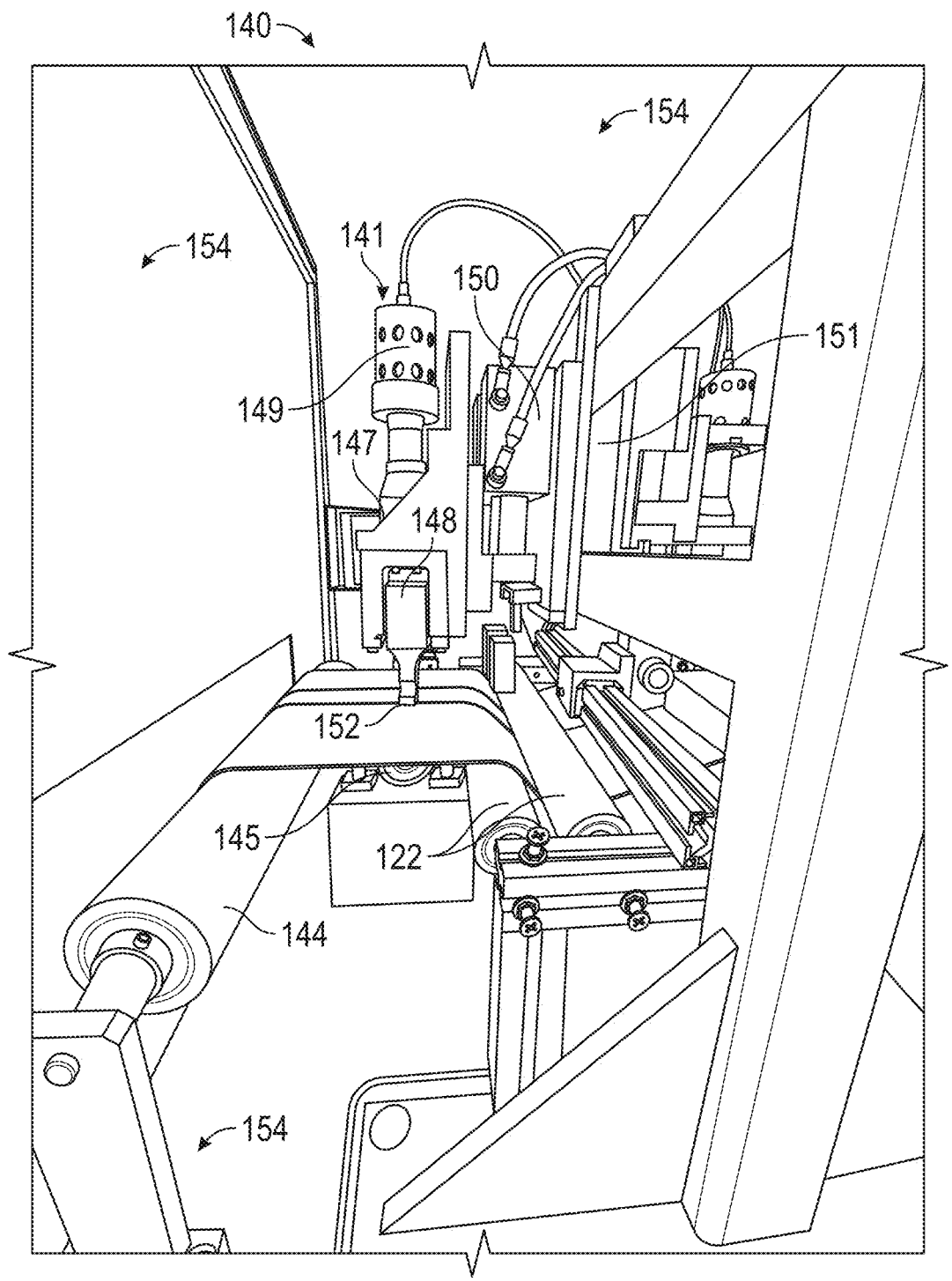
FIG. 5 is a partial perspective view (photograph) of the fabrication system shown in FIG. 1.

As perhaps best illustrated in FIG. 5, the attachment apparatuses 141 may include an attachment generator 149, a power attacher 147 and/or a horn 148. In some embodiments of the present invention, the attachment generator 149 may be connected to and/or inserted into the power attacher 147, with a horn 148 attached to the power attacher 147 at a lower portion of the power attacher 147 that is opposing the attachment generator 149. In some embodiments of the present invention the attachment generator 149 may be directly attached to the horn 148 as illustratively shown in FIG. 6. In some embodiments of the present invention, the horn 148 may comprise a sonotrode. The attachment generator 149 may be configured to create and/or generate an ultrasonic frequency which may be at a predetermined amplitude that may be pre-set by a user and may be variable. Although, it is contemplated and well understood that the attachment generator 149 may create/generate frequencies other than ultrasonic frequencies and may create/generate frequencies at a range of amplitudes such as, and without limitation, amplitudes in the range of 30-125 microns.

In some embodiments of the present invention, the attachment generator 149 may comprise ceramic disks configured to vibrate at a certain frequency when charged with electrical power. For example, and without limitation, the ceramic disks may be configured to vibrate at 20 kilohertz when charged with electrical power. However, those skilled in the art will notice and appreciate that the ceramic disks may be interchangeable with different ceramic disks of different sizes and composition in order to generate a different and/or desired frequency when the disks are charged with electrical power depending on the desired final product and the type of product material 200 used.

The ultrasonic frequency generated by the attachment generator 149 may be a predetermined ultrasonic frequency, and the amplitude of the ultrasonic frequency generated by the attachment generator may be a predetermined amplitude. The predetermined amplitude may be chosen by a user via a main interface 163 of the main system controller 162. The predetermined amplitude may be chosen by a user based upon the type of product materials 200 that are being fed into the fabrication system 140. The product materials 200 may comprise any material that may be heated/melted by being exposed to certain kinetic frequencies that may be considered ultrasonic frequencies, including, without limitation, thermoplastics, metals, textiles, and synthetic fabrics.

Some embodiments of the present invention may include the attachment generator 149 generating a variety of amplitudes, such as different amplitudes generated in a pattern to create attachment points 159, and/or different sized attachment points 159, on product materials 200 that may comprise of different types of materials and/or different sizes or thicknesses of materials, which may vary as the product materials 200 are fed/pulled through the system 100. For example, and without limitation, in some embodiments of the present invention the attachment generator 149 may be configured to generate relatively larger amplitudes for portions of product materials 200 that are relatively thicker/stronger and then generate amplitudes that are relatively lower for portions of product materials 200 that are relatively thinner/weaker. The power and timing of the amplitudes generated by the attachment generator 149 may be controlled by the main system controller 162 and/or the fabrication controller 143, which may be predetermined amplitudes and predetermined timing of the frequencies selected by a user via the main system controller 162 and/or the fabrication controller 143. Further detail about the predetermined ultrasonic amplitudes follows further below along with the discussion of an attachment sensor 157.

The attachment generator 149 may transfer the generated ultrasonic frequency to a respective power attacher 147 and/or horn 148 that the attachment generator 149 is attached with. An anvil 145 may be positioned below the horn 148, with the product materials 200 positioned traveling between the horn 148 and the anvil 145. The anvil 145 may comprise an elongated cylinder configured to rotate about a horizontal axis that extends longitudinally through the center of the cylinder.

The anvil 145 may include a motor in communication with the main system controller 162, and the motor may be configured to rotate the anvil 145 at a speed determined by the main system controller 162. The speed at which the motor rotates the anvil 145 may be a speed equal to the rate at which the product material 200 are being fed/pulled through the system 100 or may be any other speed as inputted by a user into the main interface 163 and/or as automatically determined by the main system controller 162. The anvil 145 may include one or more anvil teeth 146 positioned on the curved surface of the anvil 145. The anvil teeth 146 may be positioned on the anvil 145 in a predetermined pattern so that a desired pattern of contact points 152 and attachment points 159 are created on the product materials 200.

The predetermined pattern of the anvil teeth 146 may be selected by a user so that a desired pattern of attachment points 159 may be created at the contact points 152 for a desired final product to be created. The anvil teeth 146 may also vary in size and shape depending upon what size and shape is desired for the attachment points 159 for a given product material 200 to be developed into a desired final product. The anvil 145 may be configured to rotate about its horizontal axis at a predetermined rate which may be chosen to obtain a desired pattern of attachment points 159 on the product materials 200. Such as, without limitation, the pattern of attachment points 159 illustratively shown in FIG. 14.

The attachment apparatuses 141 may be actuated relative to their respective anvil 145 by a respective actuator 150. The actuator 150 may actuate the attachment apparatus 141 to and away from the anvil 145 such that the horn 148 abuts/presses the product materials 200 against the anvil teeth 146 of the anvil 145 to transfer the ultrasonic frequency generated by the attachment generator 149 to the product materials 200. The amount of movement and/or the pressure applied by the attachment apparatus 141 on the product materials 200 against the anvil teeth 146 of the anvil 145 may be manually controlled by a user and/or computationally controlled by the main system controller 162, by a control unit 180, and/or by an attachment sensor 157. Further detail on the main system controller 162, control unit 180, and the attachment sensor 157 follows further below.

In some embodiments of the present invention, the attachment apparatuses 141 may be directly connected to the support structure 151 such that the attachment apparatuses 141 are not actuated and are in a fixed position relative to the support structure 151 such that the anvil teeth 146 of the anvil 145 will move, push, and/or press the product materials 200 towards and against the horn 148 of the attachment apparatus 141 to create a contact point 152 and attachment points 159 without having to actuate the attachment apparatus 141 with an actuator 150.

Figure 6:
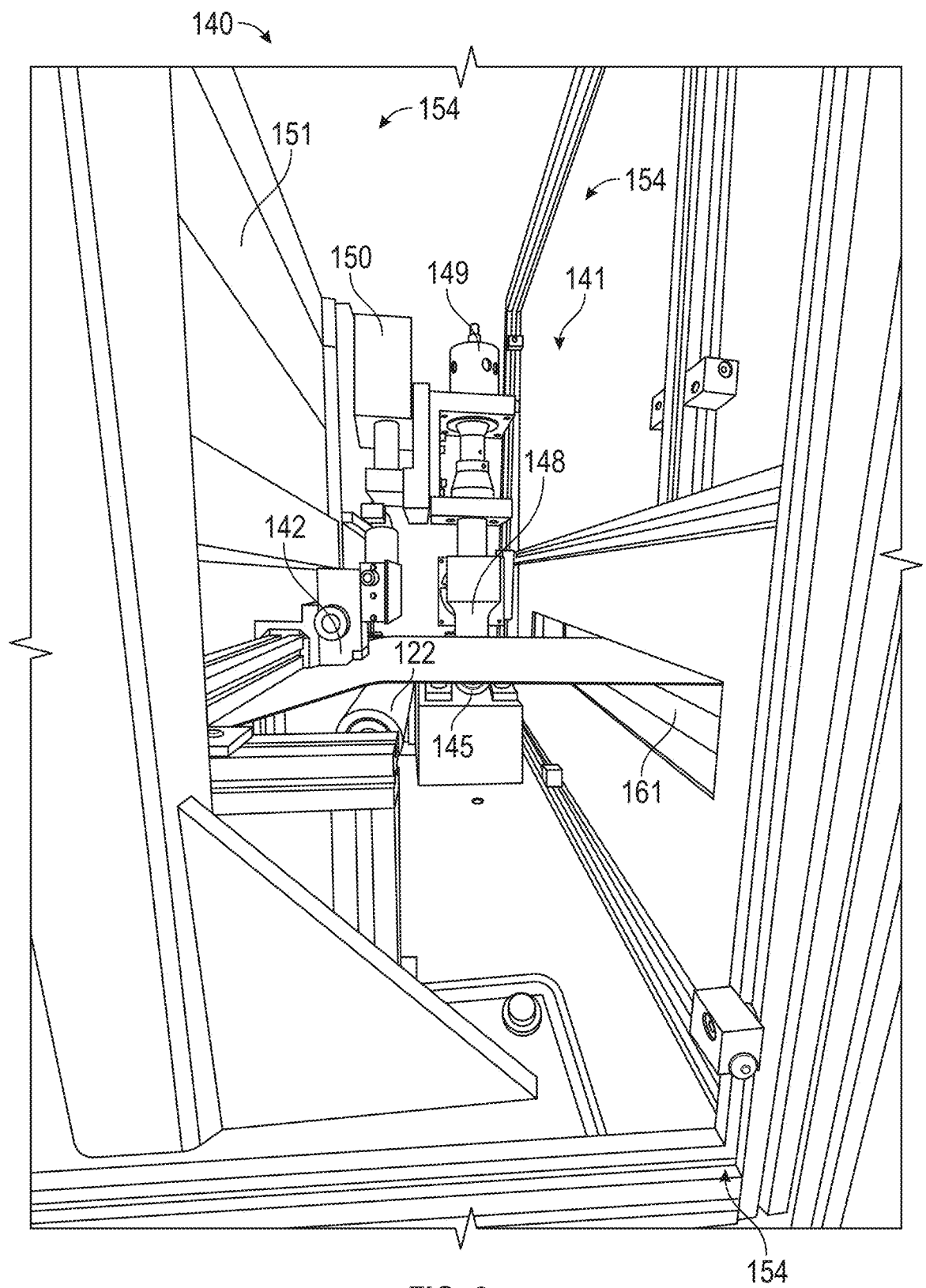
FIG. 6 is another partial perspective view (photograph) of the fabrication system shown in FIG. 1.
Figure 7:
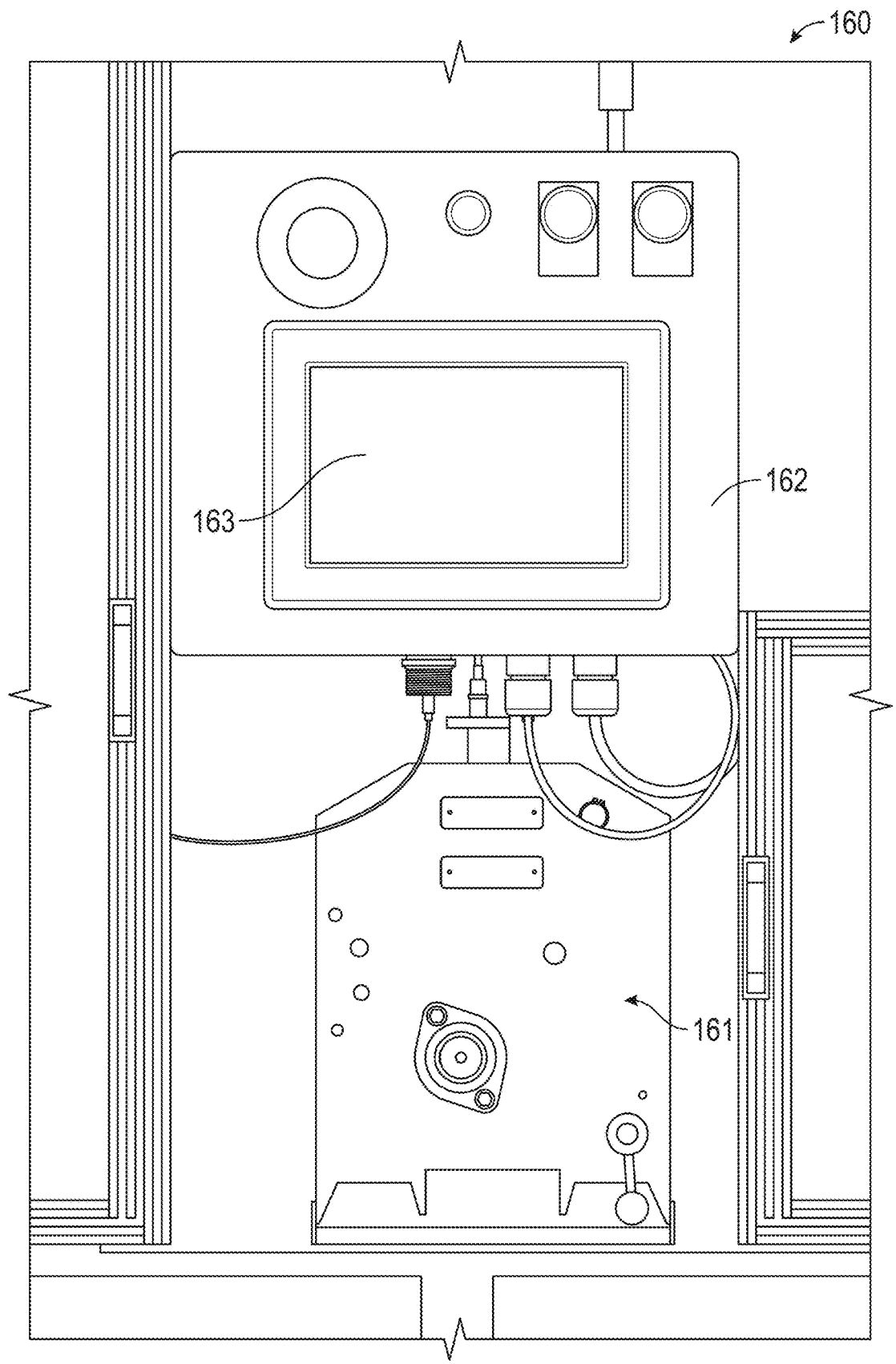
FIG. 7 is a perspective view (photograph) of a product uniformer of the ultrasonic welding system illustrated in FIG. 1.

Some embodiments of the present invention may include an aperture generator 142 (illustrated in FIG. 6). The aperture generator 142 may be configured to create through-holes 130 that extend partially into and/or all the way through a portion of one or more product materials 200. The aperture generator 142 may be attached to the support structure 150 and positioned directed towards the product materials 200 fed into the fabrication system 140. The aperture generator 142 may comprise, without limitation, a laser, a puncher, a cutting instrument, and/or any other component capable of creating an incision or through-hole 130 in product materials 200 as understood by those skilled in the art. In preferred embodiments of the present invention, the aperture generator 142 comprises a laser capable of creating through-holes 130 in various product materials 200.

The aperture generator 142 may be configured to create a through-hole 130 that extends through only a portion of the product material 200 without the through-hole extending all the way through the product material 200. The aperture generator 142 may also be configured to create through-holes in layers of product material 200 that extend only through only a select layer or number of layers of product material 200 that is layers with other product materials 200. It is also contemplated and well understood that the aperture generator 142 may also create through-holes in layered product materials 200 that extend all the way therethrough.

The aperture generator 142 may be manually controllable by a user and/or automatically controllable by the main system controller 162 or another input interface/controller in communication with the aperture generator 142. A user may enter inputs regarding the desired extent, pattern, and size of the through-holes to be created in the product materials 200 by the aperture generator 142 via the main system controller 162 or the other input interface/controller in communication with the aperture generator 142. In the case where the aperture generator 142 comprises a laser, the pattern, size, shape, depth, and/or extent of the through-holes 130 created by the aperture generator 142 in the product materials 200 may be controlled by regulating the length of time and/or the intensity of the laser when the laser is activated based on inputs made by a user via the main system controller 162 or another input interface/controller in communication with the aperture generator 142.

Some embodiments of the present invention may include shielding 154. The shielding 154 may comprise an enclosure surrounding all of, or at least a portion of, the fabrication system 140. The enclosure of the shielding 154 may comprise at least one barrier that filters or prevents light passing therethrough. For example, without limitation, the enclosure may include laser filtering windows that prevent lasers and portions of light from passing through the enclosure of the shielding 154 for increased safety.

An aperture sensor 157 (illustrated in FIG. 13) may be positioned adjacent to, or following, the aperture generator 142 relative to the path of travel of the product material 200 travels through the fabrication system 140. The aperture sensor 157 may be configured to sense and determine the parameters of the through-holes 130 created by the aperture generator 142 in the product materials 200. The aperture sensor 157 may send an aperture detection signal related to the parameters of the detected through-holes 130 to the main system controller 162, the aperture generator 142, or the other input interface/controller that is in communication with the aperture sensor 158. A user may input the desired parameters of the through-holes 130 to be created in the product materials 200 by the aperture generator 142 via to the main system controller 162, the aperture generator 142, or the other input interface/controller that is in communication with the aperture sensor 157 and in communication with the aperture generator 142.

Upon the main system controller 162, aperture generator 142, and/or other input interface/controller receiving the aperture signal from the aperture sensor 158, it may determine whether the through-holes 130 created by the aperture generator 142 are the same and/or about the same as the parameters of the through holes 130 inputted by the user. Based on the aperture signal received from the aperture sensor 158 to the main system controller 162, the aperture generator 142, or the other input interface/controller may cause the aperture generator 142 to make a predetermined action. For example, without limitation, when the main system controller 162, the aperture generator 142, or the other input interface/controller receive an aperture signal and determine that the through-holes 130 are above a predetermined length, width, depth, and/or size from the selected parameters of the user, the aperture generator 142 may be caused to decrease the length, width, depth, and/or size of the through-holes made in the product materials 200 and vice versa.

Some embodiments of the present invention may include one or more attachment sensors 157. The attachment sensor 157 may be positioned following one or more of the attachment apparatuses 141 with respect to the movement of the product materials 200 through the fabrication system 140. The attachment sensor 157 may be in communication with a main system controller 162 and/or one or more of the attachment apparatuses 141 or fabrication controllers 143. The attachment sensor 157 may be configured to sense and/or determine the parameters of the attachments points 159 created on the product materials 200 by the attachment apparatuses 141.

The attachment sensor 157 may also be configured emit an attachment signal regarding the parameters of a detected attachment point 159. The attachment signal may be received by the main system controller 162, fabrication controller 143, and/or by the relevant attachment apparatus 141 that created the detected attachment point 159. The parameters of the detected attachment point 159 may include the size, geometric area, depth, and/or the transparency of the detected attachment point 159.

In some embodiments of the present invention, the main system controller 162, fabrication controller 143, and/or the attachment apparatus 141 may be configured to determine the parameters of the attachment points 159 based upon the attachment signal received from the attachment sensor 157 and may be configured to cause the relevant attachment generator 149 to take a predetermined action based upon the determined parameters. For example, and without limitation, upon the attachment apparatus 141, fabrication controller 143, and/or the main system controller 162 receiving an attachment signal generated by the attachment sensor 157 that the attachment points 159 are more transparent than a predetermined transparency, or that there are apertures extending through the attachment points 159, then the relevant attachment apparatus 141 that created that attachment point 159 may be caused to decrease the amplitude that the attachment generator 149 generates the ultrasonic frequency to reduce the amount of heat produced in the product materials 200 at the contact points 152.

Another example, without limitation, upon the attachment apparatus 141, fabrication controller 143, and/or the main system controller 162 receiving and an attachment signal from the attachment sensor 157 informing that the attachment points 159 are shallower than a predetermined depth, then the relevant attachment apparatus 141 that created the attachment points 159 may be caused to increase the amplitude that the attachment generator 149 generates the ultrasonic frequency.

Now additionally referring to FIG. 11, some embodiments of the present invention may include a control unit 180 that may be in communication with the actuators 150, which may include fluid communication. The control unit 180 may comprise a pneumatic pump, hydraulic pump, and/or an electronic controller. The actuators 150 may comprise a pneumatic actuator, hydraulic actuator, magnetic actuator, and/or an electronic actuator. The control unit 180 may be configured to control, manage, and operate the actuation movements of the actuators 150. The control unit 180 may be manually operable by a user to set a select range and/or a select timing of the actuation movements of the actuators 150.

In some embodiments of the present invention, the control unit 180 may be in communication with the attachment sensors 157, and the control unit 180 may be configured to receive the attachment signals from the attachment sensors 157. Upon the control unit 180 receiving an attachment signal from the attachment sensor 157 regarding the attachment points 159 created by an attachment apparatus 141, the control unit may cause the relevant actuator of the attachment apparatus 141 to take a predetermined action.

For example, without limitation, upon the control unit 180 receiving an attachment signal informing that the attachment points 159 created by an attachment apparatus 141 are more transparent than a predetermined transparency, or that the attachment points 159 have apertures present therethrough, the control unit 180 may cause the relevant actuator 150 to decrease the selected range of actuation movement to reduce the pressure caused at the contact point 152 on the product materials 200. Another example, without limitation, upon the control unit 180 receiving an attachment signal informing that the attachment points 159 created by an attachment apparatus 141 are shallower than a predetermined depth, the control unit 180 may cause the relevant actuator 150 to increase the selected range of actuation movement to increase the pressure cause at a contact point 152 of the product materials 200.

Figure 8:
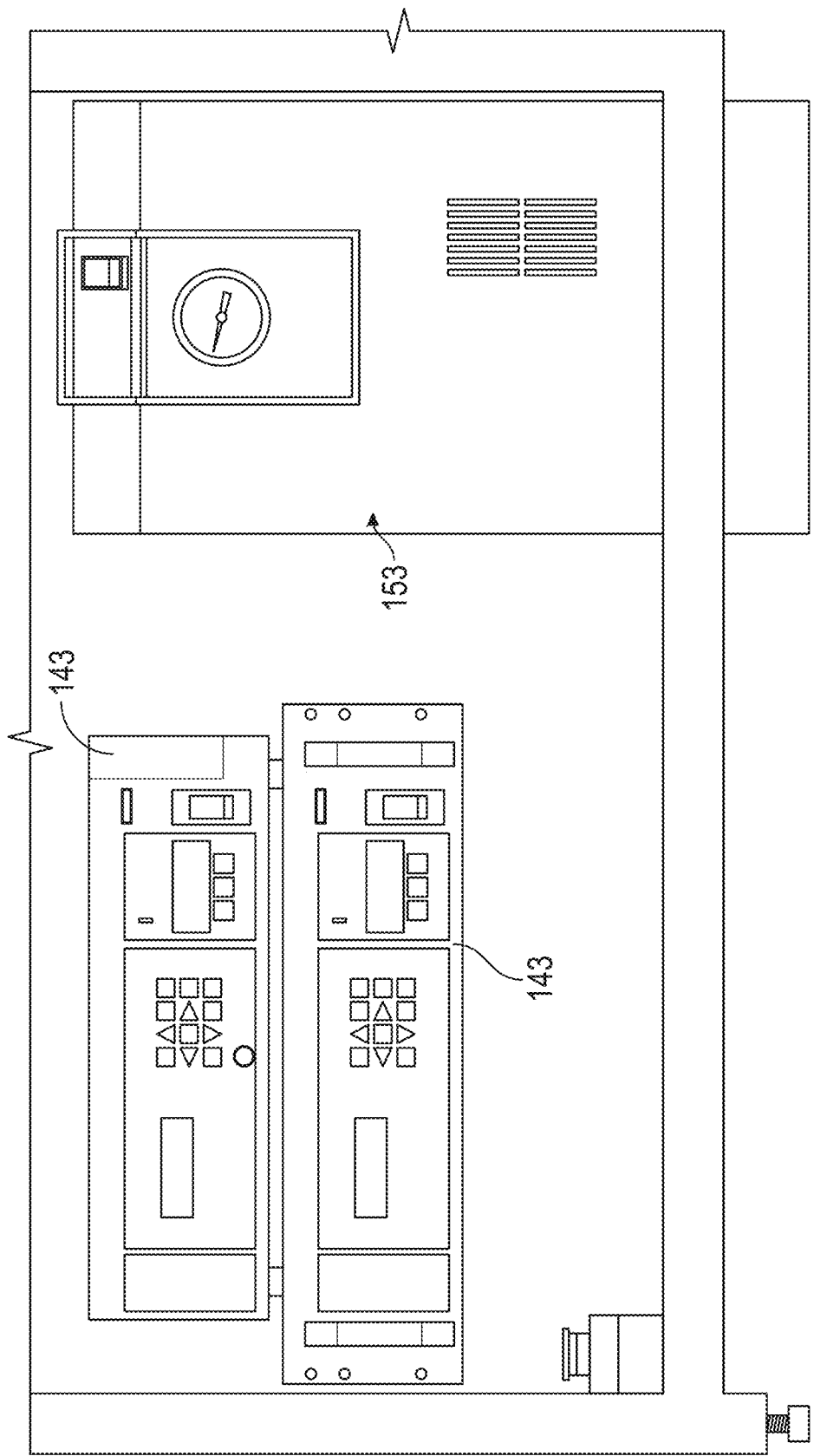
FIG. 8 is a perspective view of fabrication controllers and a filter system of the ultrasonic welding system illustrated in FIG. 1.

Now referring to FIG. 8, in some embodiments of the present invention that include a control unit 180 that comprise a pneumatic pump, and/or actuators 150 that comprise pneumatic actuators, may include an air cleanser device 153. The air cleanser device 153 may be in fluid communication with the control unit 180 and/or the actuators 150. The air cleanser device 153 may remove moisture, particulate matter, dust, and/or debris from the air used by the control unit 180 to pneumatically operate the actuators 150.

Now referring to FIGS. 1, 6-7, and 12-14, some embodiments of the present invention may include a product uniformer 161. The product uniformer 161 may be positioned following the fabrication system 140 relative to the flow of the product materials 200 moving in to and out from the fabrication system 140. The product uniformer 161 may control the rate at which the product materials 200 are pulled/passed through the system 100. The product uniformer 161 may also press the product materials 200 together as they flow out from the fabrication system 140 to ensure that the product materials 200 maintain a relatively uniform and are about flat along a longitudinal plane, and/or to ensure that the attachment points 159 of the product materials 200 are flattened and/or maintain a good attachment of the product materials 200 to each other.

The product uniformer 161 may include a number of product uniformer rollers 169 that compress and grasp the product materials 200 as the product materials 200 pass through the product uniformer 161 from the fabrication system 140 to the finalization system 160. The product uniformer rollers 169 may have a surface configured to grip and/or grasp the product materials 200 as the product materials 200 pass through the product uniformer 161. For example, and without limitation, the surface of the product uniformer rollers 169 may comprise rubber, metals, plastics, and/or composites (which may have a textured finish) to increase the grip of the product materials 200 by the product uniformer rollers 169. In some embodiments of the present invention, the product uniformer rollers 169 may comprise nip rollers.

Nip rollers are traditionally used to pull materials of a single thickness, such as, a single thickness of product material 200. However, some embodiments of the present invention that include having the product uniformer 161 pulling/pushing product material 200 comprising materials having different thicknesses and/or widths such that the height of the product material 200 is less than uniform. To solve this problem, those skilled in the art will notice and appreciate that some embodiments of the present invention may include a uniformer roller 169 comprising a variable thickness nip roller. The variable thickness nip roller of may include an attachment and/or layering adhesive tape, which may comprise adhesive-backed Teflon tape. The adhesive tape may be attached and/or layered in a predetermined pattern onto the curved surface of the nip roller, which may be positioned along a central longitudinal axis of the nip roller. The predetermined pattern and quantity of tape may be positioned/layered on the curved surface of the nip roller such that the nip roller may about match and/or abuttingly engage a majority (>50%) of a surface area of the product material 200 which comprises materials having different thicknesses and/or widths such that the height of the product material 200 is less than uniform.

Alternatively, the predetermined pattern of the adhesive tape attached and/or layered onto the nip roller may be positioned in a spiral pattern on the curved surface of the along a central longitudinal axis of the nip roller. The adhesive tape may decrease the likeliness of slippage between the uniformer roller 169 and the product material 200 due to a less than uniform height of the product material 200. In embodiments of the present invention not including the adhesive tape on the uniformer roller 169, a portion of the product material 200 may become slack while another portion of the product material 200 may become tight, which may cause the product material 200 to move back and forth longitudinally along the uniformer roller 169 in the product uniformer 161. The spiral pattern of the adhesive tape may act like a rotating screw that may pull the product material 200 taut along a width of the product material 200.

The product uniformer rollers 169 may include motors to cause and control rotational movement of the product uniformer rollers 169 about a longitudinal axis that is at a center of the respective product uniformer roller 169. The product uniformer rollers 169 may be in communication with the main system controller 162 and the control unit 180. The main system controller 162 and/or the control unit 180 may monitor, control, and maintain the speed at which the product uniformer rollers 169 are rotated by the motors such that the speed at which the product materials 200 are moved through the system 100 are thus maintained and controlled by the main system controller 162 and/or the control unit 180. The speed at which the product uniformer rollers 169 and that the product materials 200 are moved at may be controlled by a user selecting a speed, which may be defined as a predetermined product speed, into a main interface 163 of the main system controller 162.

The main system controller 162 may be in communication with the control unit 180, and the main system controller 162 may emit a predetermined product speed related to the predetermined product speed entered by a user into the main interface 163. The predetermined product speed signal may be receivable by the control unit 180. Upon the control unit 180 receiving the predetermined product speed signal, the control unit 180 may cause the product uniformer rollers 169 to rotate at the predetermined product speed.

Some embodiments of the present invention may include material monitors 126 and pace resistors 129. The material monitors 126 may be positioned facing a respective pace feeder 121 and/or the product materials 200 carried by a respective pace feeder 121. The material monitors 126 may be in communication with the main system controller 162, the control unit 180, and/or the pace resistors 129. The material monitors 126 may sense, detect, and/or monitor the amount of product materials 200 carried by its respective pace feeder 121. The pace resistors 129 may be attached to a respective pace feeder 121. The pace resistors 129 may apply a resistance force opposing the rotational movement of the respective pace feeder 121 that the pace resistor 129 is attached to. For example, and without limitation, the pace resistors 129 may comprises a drum brake, disk brake, and/or a magnetic brake. The pace resistors 129 may be in communication with the main system controller 162, the control unit 180, and/or a respective material monitor 126.

The material monitors 126 may emit a product material amount signal relating to the amount of product material 200 sensed and/or detected carried by a respective pace feeder 121. The product material amount signal may be received by the main system controller 162, the control unit 180, and/or the pace resistors 129. Based upon the main system controller 162, the control unit 180, and/or the pace resistors 121 receiving the material amount signal, the main system controller 162, the control unit 180, and/or the pace resistors 121 may cause the respective pace feeder 121 to change and/or maintain the speed at which the pace feeder 121 rotationally moves, and thus change and/or maintain the speed at which the product materials 200 are released from the pace feeder 121. Those skilled in the art will notice and appreciate that when the product materials 200 comprise a roll of material that unravels as the product materials 200 are unraveled, as the diameter of the roll of material changes, the rotational speed of the rotation of the respective pace feeder 121 must be adjusted to maintain the release of the product materials 200 at a predetermined speed selected by a user input at the main system controller 162.

Upon the main system controller 162 receiving a product amount signal that the product material 200 of a respective pace feeder 121 that the diameter of the product material 200 is at a present diameter value, the main system controller 162 may determine and/or calculate what resistance force the pace resistors 129 must maintain in order to cause the product material 200 to be released from the respective pace feeder 121 in order to release the product material 200 at the predetermined product material speed selected by the user. Upon the main system controller 162 determining the resistance force the respective pace resistor 129 must maintain, the main system controller 162 may cause the respective pace resistor 129 to apply and/or maintain that determined resistance force, which may be done via the main system controller 162 communicating with the control unit 180 to cause the control unit 180 to control the relevant pace resistor 129 to apply and/or maintain that determined resistance force.

Figure 9:
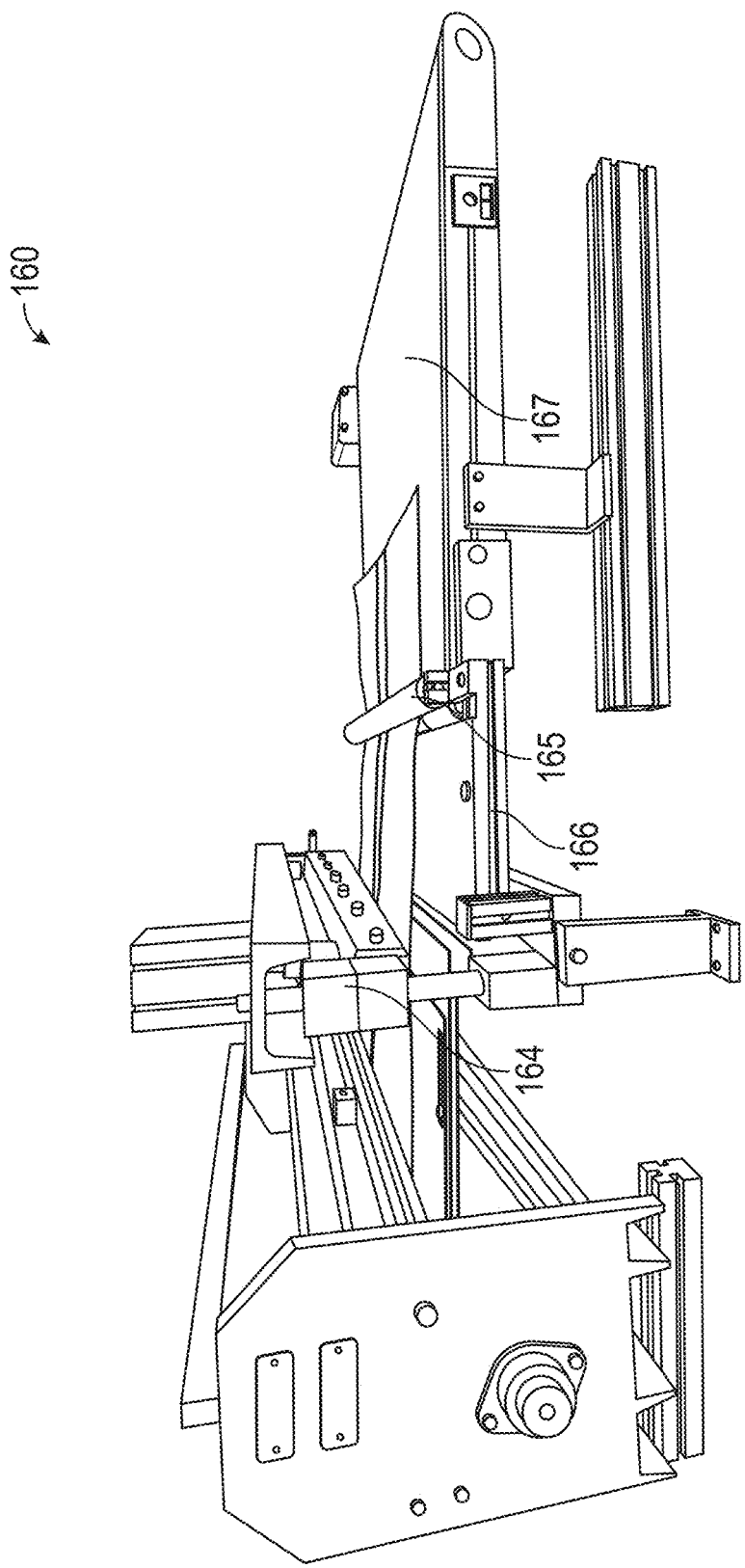
FIG. 9 is a perspective view of the finalization system shown in FIG. 1.

Now additionally referring to FIG. 9, as the product materials 200 exit the fabrication system 140 and/or the product uniformer 161, the product materials 200 may flow into the finalization system 160. The finalization system 160 may include a main system controller 162, a product separator 164, a grasping device 165, and a motion inducer 167. The grasping device 165 may be positioned abutting the motion inducer 167. The grasping device 167 and the motion inducer 167 may be positioned to accept the product materials 200 as they exit the fabrication system 140 and/or the product uniformer 161. The grasping device 165 may comprise a roller and may include a motor that is in rotational communication with the roller to cause the roller to rotate about a longitudinal axis. The motion inducer 167 may comprise a conveyor belt or other device with similar capabilities as a conveyor belt as understood by those skilled in the art.

The grasping device 165 and the motion inducer 167 may, in conjunction, grasp the product materials 200 as they exit the fabrication system 140 and/or the product uniformer 161, and may apply a force on the product materials 200 directed away from the fabrication system 140. The product separator 164 may be positioned adjacent to the fabrication system 140 and/or the product uniformer 161, and the product separator 164 may carry the grasping device 165. The product separator 164 may be configured to separate the product materials 200 as the product materials 200 exit the fabrication system 140 and/or the product uniformer 161 by creating a separation in the product material 168. The product separator 164 may comprise of a cutting implement that is sized to be at least the same length as a longitudinal width of the product materials 200.

The product separator 164 may also comprise a separation platform 166 to which the grasping device 165 may be carried by. The separation platform 166 may include one or more surfaces that are at least the same width as the product materials 200, and the separation platform 166 may include a division area that travels through a length of a surface of the separation platform 166. The division area may be sized to allow the cutting implement to separate the product materials 200 without the cutting implement coming into contact with the separation platform 166.

The product separator 164 may be configured to actuate so that the cutting implement of the product separator 164 creates a cut that separates the product materials 200 from one another. The product separator 164 may also comprise a separation platform 166 to which the grasping device 165 may be carried by. The separation platform 166 may include one or more surfaces that are at least the same width as the product materials 200, and the separation platform 166 may include a division area that travels through a length of a surface of the separation platform 166. The division area may be sized to allow the cutting implement to separate the product materials 200 without the cutting implement coming into contact with the separation platform 166.

The product separator 164 may also be configured to move between a reset state and a separation state. The reset state may be defined as when the product separator 164 is positioned in adjacent proximity to the fabrication system 140 and/or the product uniformer 161. The separation state may be defined as when the separation platform 166 is overlaying at least a portion of the motion inducer 167.

The product separator 164 may be configured to move from the reset state to the separation state at the same rate of movement as the product materials 200 is exiting the fabrication system 140 and/or the product uniformer 161 so that the product separator 164 is matching the speed and direction of movement of the product materials 200 for the cutting implement to separate the product materials 200 where attachment points 159 are located. The grasping device 165 and/or the motion inducer 167 may rotationally move to eject and/or move the product materials 200 in a direction away from the finalization system 160 once the product materials 200 have been separated by the product separator 164.

Now referring to FIGS. 1, 4-6, and 13, the one or more retention members 122 may be positioned occasionally following the path of travel that the product materials 200 travel through the system 100. The retention members 122 may comprise cylinders which may be configured to be readily moveable about a horizontal axis that travels longitudinally through a center of the retention member 122 by an application of force against the retention member 122. In some embodiments the retention members 122 may include a respective motor in mechanical communication with the retention member 122. The motor may be configured to cause the retention members 122 to rotationally move at a predetermined speed that may be chosen by a user or by the main system controller 162, the feeding device controllers 123, and/or the main system controller 162.

Figure 10:
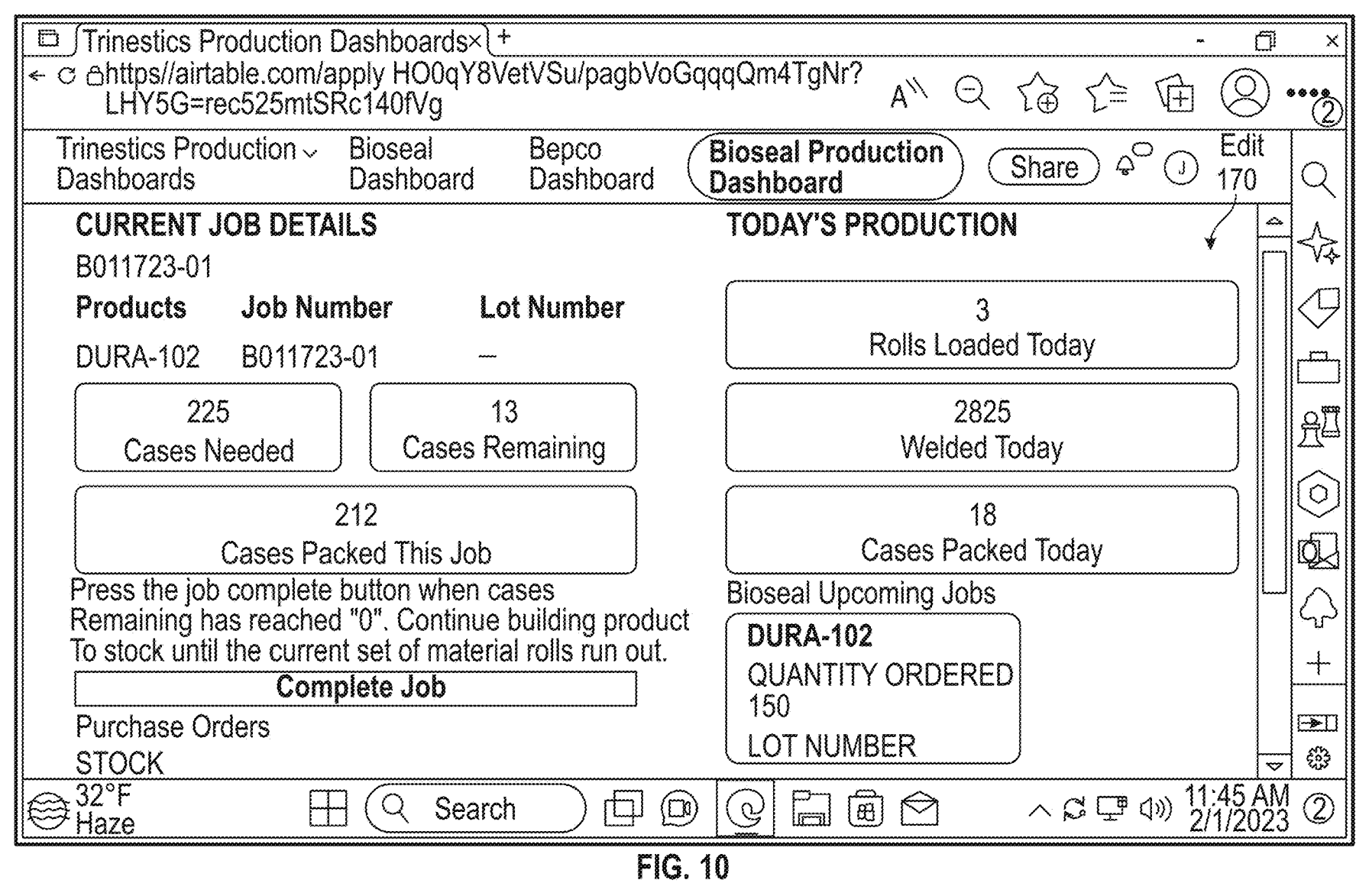
Figure 15:
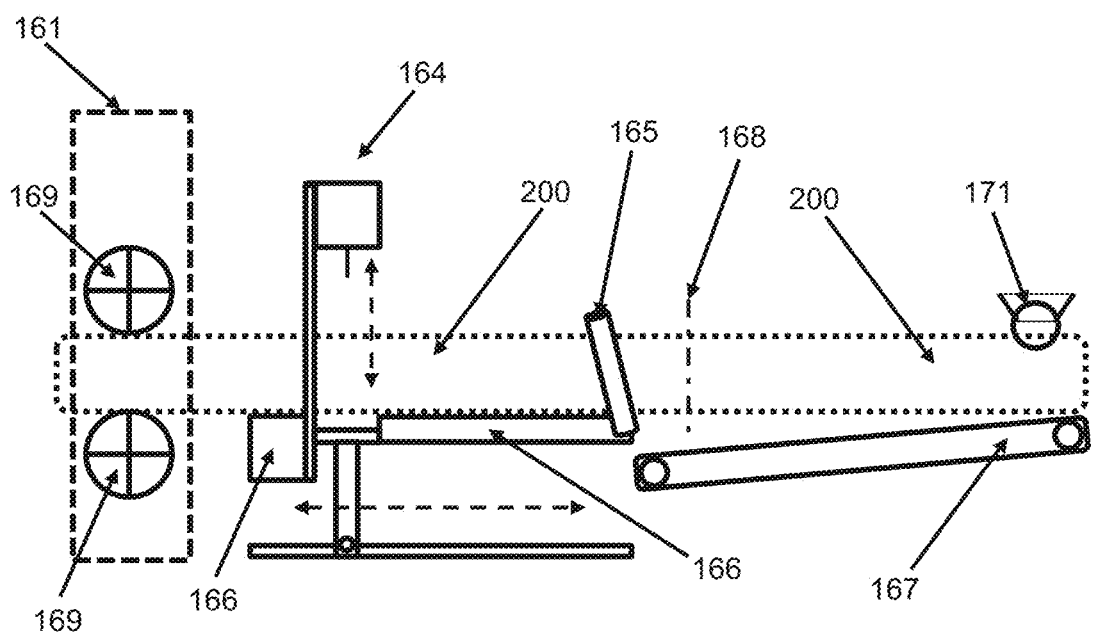
FIG. 15 is a schematic diagram of the finalization system shown in FIG. 1.

Now referring to FIGS. 10, 12, and 15, some embodiments of the present invention may include a product reporter 170. The product reporter 170 may be in communication with a reporter sensor 171. The product reporter 170 may include a display configured to display a graphical user interface. The reporter sensor 171 may be positioned facing the motion inducer 167, and the reporter sensor 171 may be configured to detect when a product material 200 has been ejected by the motion inducer 167 after the product material 200 has been separated by the product separator 164. Upon the reporter sensor 171 detecting that a product material 200 has been ejected by the motion inducer 167, the reporter sensor 171 may emit a product count signal regarding the detection of the product material 200 being ejected by the motion inducer 167.

The product count signal may be received by the product reporter 170. Upon the product reporter 170 receiving the product count signal, the product reporter 170 may display the number of product material 200 ejected from the motion inducer 167 since a predetermined period of time on the graphical user interface. In some embodiments of the present invention, the product separator 164 may be in communication with the product reporter 170 and the product separator 164 may emit the product count signal each time the product separator 164 actuates to separate the product material 200. In other embodiments of the present invention, the main system controller 162 may be in communication with the product reporter 170 and the product separator 164 may emit the product count signal each time the product separator 164 actuates to separate the product material 200 with the main system controller 162 forwarding the product count signal to the product reporter 170.

Now referring to FIG. 12, an embodiment of the present invention may include a power source 300 that is in communication with any and/or all of the above mentioned components of the system 100. The power source 300 may provide, emit, and/or regulate power to and for the system 100. The power source 300 may comprise a battery, electric generator, power plug-in, and any other device or supply of power that can be used for the power supply 300 as understood by those skilled in the art.

Some of the illustrative aspects of the present invention may be advantageous in solving the problems herein described and other problems not discussed which are discoverable by a skilled artisan.

While the above description contains much specificity, these should not be construed as limitations on the scope of any embodiment, but as exemplifications of the presented embodiments thereof. Many other ramifications and variations are possible within the teachings of the various embodiments. While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment, or particular embodiments, disclosed as the best or only mode contemplated for carrying out this invention, but that the invention will include all embodiments falling within the description of the invention. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced items.

Thus the scope of the invention should be determined by the appended claims and their legal equivalents, and not by the examples given.

What is claimed is:

1. An ultrasonic welding system for assembling materials, the system comprising:
 a feeding device comprising:
  a plurality of pace feeders, each one of the plurality of pace feeders configured to carry and supply a respective product material;
  a plurality of position feeders, each one of the plurality of position feeders configured to receive and distribute the respective product material from a respective one of the plurality of pace feeders; and
  at least one retention member to receive, distribute, and layer the respective product materials from the plurality of position feeders with one another to form a layering of product materials;
 a fabrication system comprising:
  a main retention member to receive and distribute the layering of product materials along a path of travel;
  a plurality of attachment apparatuses positioned on a first side of the path of travel;
  a respective plurality of anvils positioned on a second side of the path of travel opposite the first side, each one of the respective plurality of anvils positioned adjacent to a respective one of the plurality of attachment apparatuses to define a contact point between the anvils and the attachment apparatuses; and
  an aperture generator to create at least one through-hole that extends through at least a portion of at least one layer of the layering of product materials;

wherein at least one portion of the layering of product materials is pressed to create at least one attachment point at the contact point to attach at least two layers of the layering of product materials;

a product uniformer to receive and distribute the layering of product materials and to move the layering of product materials along the path of travel; and a finalization system comprising:
  a product separator to cut the layering of product materials into a plurality of finished products; and
  a motion inducer to eject each of the plurality of finished products from the product separator.

2. The system of claim 1, further comprising a plurality of pace resisters that are each attached to the respective plurality of pace feeders; wherein the respective product materials comprise a roll of product materials; wherein each of the plurality of pace feeders rotatably move about an axis to supply the roll of product materials; and wherein the pace resistors selectively apply a resistance force that opposes the rotational movement of the respective plurality of pace feeders to apply a tension force to the product materials when moved by the product uniformer.

3. The system of claim 1, wherein the position feeders selectively actuate along a longitudinal axis to receive and dispense the product materials at a predetermined position relative to the at least one retention member.

4. The system of claim 3, further comprising a plurality of position sensors that are positioned adjacent to the respective position feeders; wherein each of the plurality of position sensors detects the position of the respective product materials of the respective position feeder that the position sensor is adjacent to; wherein each one of the plurality of position sensors emits a product position signal related to the position of the respective product material along the respective position feeder; and wherein the product position signal is received by a feeding device controller.

5. The system of claim 4, wherein the feeding device controller is configured to control the actuation of at least one of the plurality of position feeders based on the product position signal received.

6. The system of claim 1, wherein the feeding device is separate and spaced apart from the fabrication system.

7. The system of claim 1, wherein at least one of the respective product materials has a size and shape that is different from the other respective product materials.

8. The system of claim 1, wherein the aperture generator creates a plurality of through-holes; and wherein the plurality of through-holes define a predetermined pattern of through-holes.

9. The system of claim 1, wherein the at least one attachment point defines a plurality of attachment points that are formed in a predetermined pattern.

10. The system of claim 1, wherein each of the plurality of attachment apparatuses comprise an attachment generator to generate an ultrasonic frequency to generate heat at the contact point to create the at least one attachment point.

11. The system of claim 10, wherein at least one of the plurality of attachment apparatuses comprises a horn attached to the attachment generator to transfer the ultrasonic frequency to the contact point.

12. The system of claim 10, wherein the heat generated at the contact point by the ultrasonic frequency causes the layering of product materials to melt locally at the contact point to create the at least one attachment point.

13. The system of claim 1, wherein the plurality of attachment apparatuses actuate relative to the respective plurality of anvils to press the at least one portion of the layering of product materials against the respective plurality of anvils.

14. The system of claim 1, wherein the each of the plurality of anvils comprise a plurality of anvil teeth positioned along a curved surface of the anvil; and wherein each of plurality of anvils rotatably move to position the plurality of anvil teeth at the contact point to press the at least one portion of the layering of product materials against the attachment apparatuses.

15. The system of claim 1, wherein the aperture generator comprises at least one of a laser, a puncher, and a cutting instrument.

16. The system of claim 1, wherein the product materials comprise a material that can be melted when exposed to ultrasonic frequencies having an amplitude range of about 30 to 125 microns.

17. The system of claim 1, wherein the product separator comprises a separation platform and a cutting implement; wherein the cutting implement actuates relative to the separation platform to cut the layering of product materials into one of the finished products; and wherein the separation platform includes a division area that travels through a length of a surface of the separation platform to actuate the cutting implement to cut the layering of product materials without coming into contact with the separation platform.

18. The system of claim 1, further comprising a main system controller utilized to control the feeding device, the fabrication system, the product uniformer, and the finalization system.

19. The system of claim 1, further comprising a product reporter in communication with a reporter sensor; wherein the reporter sensor detects when each of the finished products are ejected and emits a product count signal; and wherein the product reporter displays a product count based on the product count signal.

20. The system of claim 1, further comprising shielding positioned to enclose at least a portion of the fabrication system; and wherein the shield comprises a laser light filtering window.

* * * * *